June 24, 1969 W. D. GORDON ET AL 3,451,861
SHEATHED CONDUCTOR WITH HERMETIC SEAL
Filed Feb. 23, 1967

INVENTORS
WILLIAM D. GORDON
ROBERT S. NORMAN

BY Richard E. Hosley

ATTORNEY

United States Patent Office 3,451,861
Patented June 24, 1969

3,451,861
SHEATHED CONDUCTOR WITH HERMETIC SEAL
William D. Gordon, Lynn, and Robert S. Norman, Marblehead, Mass., assignors to General Electric Company, a corporation of New York
Filed Feb. 23, 1967, Ser. No. 618,168
Int. Cl. H01v 1/08
U.S. Cl. 136—230                                      3 Claims

ABSTRACT OF THE DISCLOSURE

A sheathed conductor having a primary insulant is hermetically sealed with a finely pulverized mixture of glass, such as Corning Glass Code 1990, and 30%–40% by weight of magnesium oxide. The mixture is cold pressed, heated to the working point of the glass, and then cooled.

Background of the invention

This invention relates to sheathed electrical conductors and is particularly concerned with an improved sheathed electrical conductor having a hermetic sealing structure.

The sheathed conductors of the type with which the present invention is concerned are those designed for high temperature applications in which one or more conductors are enclosed within a tubular metallic sheath and supported in spaced relation within the sheath by a layer of heat refractory, electrically insulating material. Specific embodiments of such sheathed conductors may take the form of thermocouple assemblies, spark-plug connecting leads or the like.

Measurements of temperatures within high temperature power plants, such as aircraft gas turbines, are customarily made with temperature detectors employing thermocouples having conductors sheathed in a cylindrical metallic housing or barrel tightly packed with refractory insulating powder or a substantially solid ceramic core. Such thermocouples were necessarily of the most rugged construction to avoid rapid deterioration under extreme vibration and temperature conditions. However, for speed of response to rapid variations in the measured temperature, the thermocouple junction of the conductors in such temperature detectors usually extended beyond the end of the outer metallic housing through an opening in the end of that housing, and the insulating core would thus be exposed to fuel. When this occurred, the fuel penetrated the core and was drawn into the upper portions of the barrel where subsequent rapid heating could carbonize the fuel. Water vapor released by the combustion of the fuel also was drawn into the insulating material of the core in the same manner, and the result of this carbonization and the hydration was harmful because it could reduce the resistance between the conductors or between the sheath and the conductors. The principal reason behind this type of failure in thermocouple assemblies was found to lie in the necessity of exposing at least a portion of the insulant filling metallic sheath to the fuel and water vapor.

To provide a solution for this type of problem, a thermocouple assembly having a core of insulating material comprising glass and magnesium oxide was developed. Such an insulating material for sheathed electrical conductors is thoroughly described and the method for making such a sheathed conductor claimed in Patent 3,031,522, issued Apr. 24, 1962, to Robert B. Clark et al., and assigned to the same assignee as the present invention.

By way of a summary account of one aspect of that invention, there was provided a thermocouple assembly having a core of insulating material within a tubular metallic housing surrounding a pair of spaced thermocouple conductors which projected beyond one end of the core in the housing to form a thermocouple junction. The opposite end of the housing was closed by terminal provisions for thermocouple connectors. A mounting apparatus was also disposed near that end to support the free junction end in a fluid stream which was subject to temperature measurement.

In a preferred embodiment of the invention, the major portion of the insulant was comprised of powdered magnesium oxide with the addition thereof of 20% by weight of a glass which had a softening point of 915° C. and a working point of 1200° C. The magnesium oxide and the glass were mixed in a finely divided form and compacted within the sheath to form an insulant about thermocouple leads. Thereafter, the entire assembly was subjected to a heat treatment which brought the insulating material up to a temperature of about 950° C. so that the glass portion of the mixture became slightly plastic. The temperature was not elevated enough, however, to cause the glass particles to flow.

After cooling, the thermocouple assembly was found to possess several distinct improved characteristics. The insulating material was mechanically strong but not brittle, and it was even possible to machine away portions of the outer sheath without the insulant crumbling or cracking under the strain. Furthermore, thermal shock, so often encountered in the operation of such thermocouple assemblies, did not cause fracture of the rigid insulant. An additional important characteristic was that the insulant presented a nearly homogeneous barrier against the entrance of fuel or water vapor. Because the insulating material was not very porous and because the inherent toughness of the material resisted cracking under the most extreme conditions the thermocouple was likely to encounter, deterioration of the insulating value of the insulant due to the penetration of fuel or water vapor was greatly minimized. The thermocouple assembly had a considerably longer life, therefore, than most thermocouples previously designed to perform under the same conditions.

However, it was found subsequently that although the primary insulant material was itself impervious to passage of fuel or water vapors therethrough, some of these vapors did pass through the interfaces between the primary insulant and the sheath and between the primary insulant and the conductors. The vapors passed into other areas at the end opposite to the thermocouple junction.

With this difficulty in mind, it is an object of this invention to provide a sheathed conductor which is highly resistant to fracture due to thermal and mechanical shock and relatively impervious to diffusion therethrough of water vapor or carbonizable fuels tending to decrease its effectiveness as an insulating agent by providing a seal which is impervious to the passage of fuel or water vapors therethrough and which bonds metallic oxide surfaces it contacts.

A further object of this invention is to provide a novel mineral insulating composition suitable for use in sheathed conductors for high temperature applications as a sealing material.

It is still another object of this invention to provide an improved method of producing such a sealing insulating composition.

Summary

By way of illustration, a sheathed conductor is hermetically sealed in accordance with this invention by depositing a quantity of a sealing mixture in one end of a previously formed sheathed conductor including a primary insulating mixture. The sealing mixture is comosed of finely pulverized magnesium oxide and a finely pulverized glass having a thermal coefficient of expansion intermediate the coefficient of the sheath and the conductor and a working temperature which is less than the softening temperature of the primary insulant. The magnesium oxide constitutes 30%–40% by weight of the sealing mixture. After cold pressing the sealing mixture against the sheath, conductors and primary insulant, the assembly is heated to the working point of the glass in the sealing mixture and then cooled so that the seal forms a bond with the sheath and with the conductors.

Description of the preferred embodiments

Figure 1:
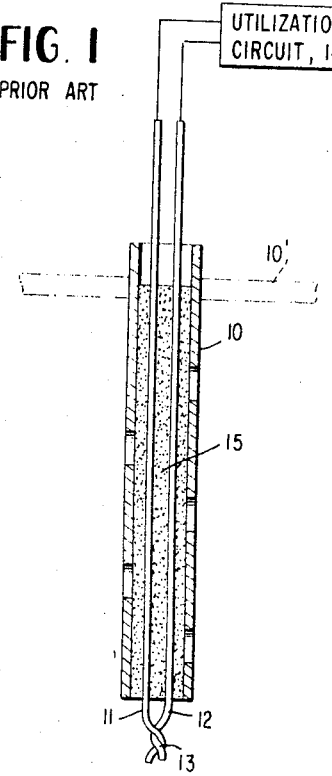
FIGURE 1 is a partly pictorial cross-sectional view of a thermocouple assembly of the prior art to which this invention is adapted.

Although this invention can be applied to any sheathed conductor utilizing a primary insulating member, the invention can best be understood by referring to FIGURE 1, which illustrates a thermocouple probe constructed in accordance with the method claimed in the referenced Clark et al. patent. The tubular thermocouple sheath or housing 10 is shown as extending through a wall 10' which is shown in phantom. To simplify the explanation, mounting means for such a probe are not shown as they are familiar to those skilled in the art. Tubular sheath 10 may be made of stainless steel or other suitable material, and a pair of thermocouple conductors 11 and 12 of dissimilar metals runs longitudinally therethrough, terminating in a protruding junction 13 at one end and in wires adapted to be connected to a utilization circuit 14.

Dissimilar conductors 11 and 12 may be of a type commonly employed in thermocouple pyrometry, one being a nickel-chromium alloy (90% nickel and 10% chromium) and the other being a nickel-aluminum alloy also containing small amounts of manganese and silicon (95% nickel, 2% aluminum, 2% manganese, and 1% silicon). Junction 13 may be rendered secure by welding. Insulation and positioning of conductors 11 and 12 is achieved by an insulating core 15.

As the composition of such insulants is well known, it suffices to state that in the Clark patent the insulant is a hard lime glass commercially available as Corning type 1710 which has a softening point, at which it becomes slightly plastic, of about 915° C. and a working point, at which it is sufficiently liquid to be shaped or blown, of about 1200° C. Since glass is a super-cooled liquid, these temperatures, though known in the trade as "points," are in reality approximate temperature regions. The same glass, however, if exposed to some form of water, may acquire considerably elevated softening and working points, presumably as a result of chemical reaction with the carbon dioxide almost always present to some degree with the water. Because small particle sizes are employed, this chemical reaction, which ordinarily takes place in a very small scale, can be very significant.

The temperatures at which the particular primary insulant changes its physical properties are important and must be known if the present invention is to be practiced intelligently instead of by trial and error for, in the heat treatment operation to which the sheath conductor assembly is subjected, the temperatures should not exceed those which would soften components in the primary insulant. For example, in a thermocouple probe utilizing Corning type 1710 glass in a homogeneous mixture with magnesium oxide, the temperature employed in obtaining the seal should not exceed 915° C.

Figure 2:
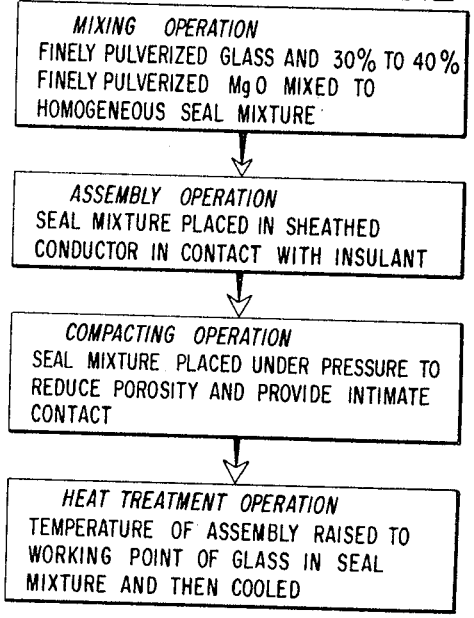
FIGURE 2 is a block diagram illustrating a method of producing a seal for a sheath conductor according to the present invention.

FIGURE 2 may be used as a ready reference guide to a quick comprehension of the steps involved in the production of sealed sheath conductors according to the present invention. In an early stage of the fabrication of the seal, magnesium oxide and glass are finely pulverized and mixed so that the magnesium oxide constitutes 30%–40% by weight of the final homogeneous seal mixture. When the filler of magnesium oxide is added, the seal is less susceptible to shock, apparently because the thermal gradient across any given increment of the glass is reduced. The particular glass which is chosen as a constituent in the seal mixture must have several properties. First, the thermal coefficient of expansion of the glass should be intermediate the thermal coefficients of expansion of the conductors and the sheath. Another characteristic of the glass is that it should, when mixed with the magnesium oxide, produce a material which is impervious to the entrance of fuel. Finally, the working point of the glass should be less than the softening point of any of the materials in the primary insulant.

For example, if the primary insulant is constituted by a mixture of 10%–30% of finely comminuted glass such as Corning type 1710 and 70%–90% of magnesium oxide, a sealing mixture of 30%–40% by weight magnesium oxide with 70%–60% of a lead-potash-soda combination such as Corning Glass Code 1990 formed in accordance with the method described hereinafter can be used. The thermal expansion of the sealing mixture approximately matches the thermocouple conductors and is less than the outer sheath expansion so the seal material is under compression with respect to the sheath after an initial firing process while very little or no stress is believed to be present at the conductors.

Although the remaining discussion of the production of a seal in accordance with this invention is directed to the particular constituent elements in the seal mixture, it will be obvious that the exercise of this invention can be varied and will be primarily dependent upon the materials from which the primary insulant, the sheath and the conductors are composed. When the Corning Glass Code 1990 and magnesium oxide mixture or other seal mixtures are used, the components should be finely pulverized and intimately mixed; for example, the glass-magnesium oxide mixture should be passed through a 325 mesh screen so as to exclude particles having a diameter greater than 1.7 mils. To form the seal, the mixture is then loaded into the thermocouple probe or other sheathed conductor and cold pressed at over 70,000 p.s.i. to reduce porosity and provide intimate contact between the glass and magnesium oxide particles. Thereafter, the mixture is subjected to a heat treatment according to the chart shown in FIGURE 3.

Figure 3:
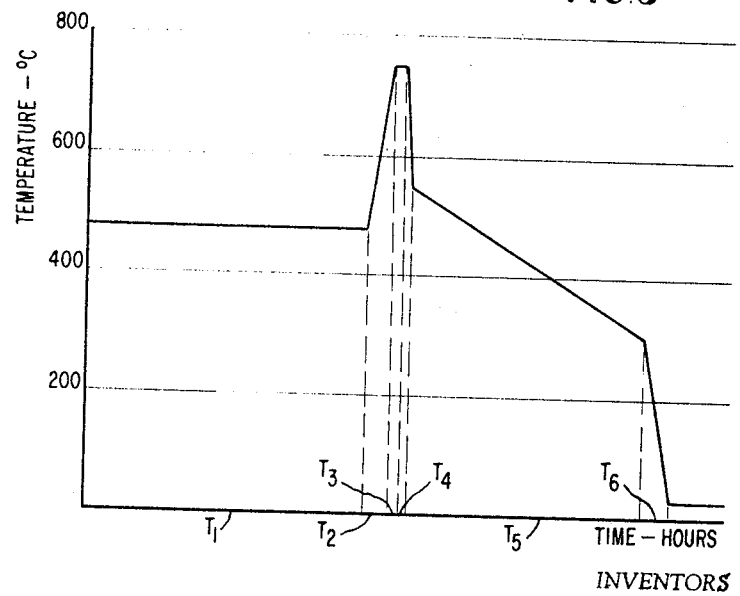
FIGURE 3 is a graph showing the heating steps necessary to produce the seal in accordance with this invention.

Referring to FIGURE 3, it will be seen that the time has been divided into six segments $T_1$–$T_6$. During the time $T_1$, the mixture is baked at a temperature which will drive off all moisture and purge air from the mixture. In the particular sealing mixture discussed above, the heating should be at about 475° C. for a period of at least four to five hours to assure that these two functions have been performed.

During the time segment $T_2$, the temperature is increased at a rate which is slow enough to induce some crystallization in the material but not so slow as to cause stratification of the material. Again referring to the particular sealing mixture, the temperature is linearly increased to about 750–760° C. during a thirty-minute interval. Thereafter, the seal is stabilized at the upper temperature for a time segment $T_3$. The upper temperature limit is determined by the value above which a refractory like and weak composition results and the maximum time segment $T_3$ is less than that which would cause stratification. For example, it is satisfactory to hold the glass-magnesium oxide mixture at 750–760° C. for five minutes.

During the time element $T_4$, the seal is cooled rapidly to prevent stratification without severely thermally shocking the seal. For example, the temperature could be dropped to about 550° C. in a period of approximately twenty minutes. Thereafter, slow cooling would be controlled so that the seal material and sheath and wires would cool uniformly to a point where the glass had become rigid, for example, to about 300° C. in about four hours. Thereafter, the seal is removed from the furnace.

Figure 4:
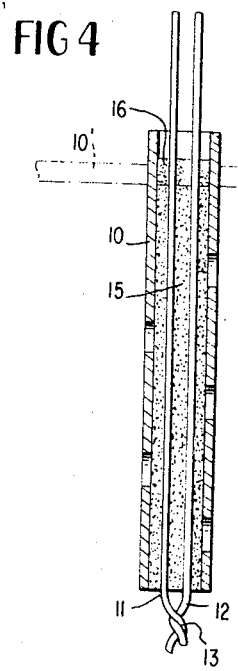
FIGURE 4 is a partly pictorial cross-sectional view of a thermocouple assembly constructed in accordance with the present invention.

The resulting structure is shown in FIGURE 4 where like numerals designate like elements from FIGURE 1. Again, the conductors 11 and 12 are in a primary insulant 15 which extends along a substantial portion of the length of the sheath 10. However, the seal 16 is shown as having been applied at one end thereof. It has been found that by following the above-described method, the seal 16 bonds to the metallic oxide of the sheath 10 and the conductors 11 and 12 so that fuel no longer can pass through the interfaces in the probe so the probe portions above the mounting plate 10′ are maintained free of fuel vapors. It is believed that the magnesium oxide adds reinforcement to the composition to strengthen it and additionally promotes a degree of crystallization of the glass to thereby increase its resistance to cracking.

If magnesium oxide is used in a greater amount than the specified proportions, it becomes increasingly difficult to form the seal. This is believed to be caused by insufficient glass present in the mixture to bond to itself and the sheath to provide a continuous glass film and an impervious mass. If less than the specified proportions are used, the composition acts more like glass alone and is susceptible to cracking. Therefore, other sealing mixtures should incorporate these parameters.

Thermocouple probes constructed in this invention have been evaluated for those thermal cycling and vibration conditions which are anticipated in jet engine applications. After subjecting thermocouple probes to such vibration and thermal cycling conditions, no significant leakage increases were measured with a mass spectrometer helium leak detector.

Therefore, in summary, this invention reveals a seal which can be adapted to any sheathed conductor when it is desired to prohibit the passage of carbonizable fuels or water vapor past a particular point. The seal is formed by utilizing a mixture of a finely pulverized glass which has a working point which is less than a softening point for a primary insulating material with magnesium oxide, the magnesium oxide constituting 30%–40% by weight of the mixture. Thereafter, the mixture is subjected to cold pressing and a heat treatment to the working point of the glass material so that the seal bonds to adjacent metal surfaces.

While this invention has been described with particular reference to a particular thermocouple probe, the invention can be practiced with thermocouple probes formed by any number of materials without departing from the true spirit and scope of this invention. Therefore, it is desired that the appended claims cover all such variations and modifications which are within the true spirit and scope of this invention.

What is claimed as new and desired to be secured by Letters Patent of the United States is:

1. In a sheathed conductor having a sheath, a conductor means within the sheath, and a primary insulant material comprising magnesium oxide and glass spacing the conductor from the sheath, the conductor being adapted to be connected to a utilization means, the improvement comprising an insulating hermetic seal surrounding the conductor means and coextensive with a portion of the sheath contiguous one end of the primary insulant, said insulating seal composed of a finely divided homogeneous mixture of magnesium oxide and glass having a thermal coefficient of expansion intermediate the coefficients for the sheath and the conductor means and a working point temperature which is less than the softening temperature for constituents in the primary insulant, said magnesium oxide constituting 30%–40% by weight of said mixture, said insulating seal being bonded to said sheath.

2. In a thermocouple probe having a sheath, a thermocouple junction, conductor means within the sheath spaced therefrom for connecting said thermocouple junction to a utilization means and a primary insulant for spacing the conductors from one another and from the sheath, the primary insulant comprising magnesium oxide and glass, the improvement comprising an insulating hermetic seal surrounding the conductor means, coextensive with a portion of the sheath and contiguous one end of the primary insulant, said insulating seal composed of a finely divided homogeneous mixture of glass and magnesium oxide, the magnesium oxide constituting 30%–40% by weight of the mixture, and the glass having a thermal coefficient of expansion intermediate the coefficients for the sheath and the conductors, the glass having a working point temperature which is less than the softening temperature for the constitutents in the primary insulant, said insulating seal being bonded to the sheath and to the conductors.

3. A thermocouple probe as recited in claim 2 wherein said finely divided glass is constituted by finely divided particles of a soda-lead-potash composition, said mixture being passed through a No. 325 mesh.

References Cited
UNITED STATES PATENTS

| | | | |
|---|---|---|---|
| 2,322,233 | 6/1943 | Granger | 174—77 X |
| 2,587,391 | 2/1952 | Scaver. | |
| 3,022,179 | 2/1962 | Morrissey | 106—39 |

E. A. GOLDBERG, *Primary Examiner.*

U.S. Cl. X.R.
106—39; 174—77, 102, 118